US008356648B2

(12) United States Patent
Blumberg

(10) Patent No.: US 8,356,648 B2
(45) Date of Patent: Jan. 22, 2013

(54) CALENDAR BINDING APPARATUS AND RELATED METHODS

(75) Inventor: Murray B. Blumberg, Gauteng (ZA)

(73) Assignee: Slideco NV, Willemstead, Caracoa (NL)

( * ) Notice: Subject to any disclaimer, the term of this patent is extended or adjusted under 35 U.S.C. 154(b) by 670 days.

(21) Appl. No.: 12/332,374

(22) Filed: Dec. 11, 2008

(65) Prior Publication Data

US 2009/0097945 A1 Apr. 16, 2009

Related U.S. Application Data

(63) Continuation-in-part of application No. 11/187,556, filed on Jul. 22, 2005, now Pat. No. 7,780,370.

(60) Provisional application No. 60/592,921, filed on Jul. 30, 2004.

(51) Int. Cl.
*B32B 37/00* (2006.01)

(52) U.S. Cl. ........ 156/359; 156/556; 156/559; 156/564; 156/573; 156/578; 156/583.1

(58) Field of Classification Search .................. 156/538, 156/556, 559, 564, 573, 578, 580, 581, 583.1, 156/575, 583.5, 350, 359
See application file for complete search history.

(56) References Cited

U.S. PATENT DOCUMENTS

| | | | | |
|---|---|---|---|---|
| 1,843,771 | A | 2/1932 | Kline | |
| 1,881,736 | A | 10/1932 | Malvin | |
| 1,906,024 | A | 4/1933 | Todd | |
| 2,074,606 | A | 3/1937 | Elliot | |
| 2,285,447 | A | 6/1942 | Malvin | |
| 2,387,808 | A | 10/1945 | Pruneau et al. | |
| 3,350,045 | A | 10/1967 | Mayers | |
| 3,867,743 | A | 2/1975 | Corey | |
| 4,009,784 | A | 3/1977 | Elias et al. | |
| 4,077,078 | A | 3/1978 | Snellman et al. | |
| 4,595,309 | A | 6/1986 | Chinchar | |
| 4,855,010 | A * | 8/1989 | Bolin et al. | 156/497 |

(Continued)

FOREIGN PATENT DOCUMENTS

DE 686982 1/1940

(Continued)

OTHER PUBLICATIONS

PCT International Search Report, PCT/IB2005/002255, Mar. 2, 2006, 7 pgs.

(Continued)

*Primary Examiner* — James Sells

(74) *Attorney, Agent, or Firm* — Wood, Herron & Evans, LLP

(57) ABSTRACT

An apparatus is provided for binding a single printed sheet with top and bottom binders to form a single sheet calendar. The apparatus includes a binder feeding mechanism for positioning the top and bottom binders relative to the single printed sheet. The apparatus includes first and second spaced, parallel binding units for respectively securing the top and bottom binders to the single sheet, with the first binding unit having an upper member and a lower member to define a sheet-receiving channel there between. At least one of the upper member or the lower member is heated, and at least one of the upper member or the lower member is controllably movable relative to the other of the upper member or the lower member, to secure one of the binders to the single sheet.

17 Claims, 2 Drawing Sheets

U.S. PATENT DOCUMENTS

| | | | | |
|---|---|---|---|---|
| 4,899,974 | A | 2/1990 | Wear et al. | |
| 5,746,879 | A * | 5/1998 | Huebner et al. | 156/516 |
| 6,042,319 | A | 3/2000 | Hoffman | |
| 6,444,286 | B1 | 9/2002 | MacKenzie | |
| 6,598,520 | B2 * | 7/2003 | Kono | 100/325 |
| 6,719,475 | B2 | 4/2004 | Arkwright | |
| 6,752,901 | B2 * | 6/2004 | Musse | 156/583.3 |
| D522,053 | S | 5/2006 | Gavronsky | |
| 2004/0114989 | A1 | 6/2004 | Gavronsky | |

FOREIGN PATENT DOCUMENTS

| | | |
|---|---|---|
| DE | 2119747 | 11/1972 |
| DE | 2503678 | 5/1976 |
| DE | 2818453 | 8/1979 |
| DE | 8702515 | 9/1987 |
| DE | 19815387 | 7/1999 |
| JP | 07228074 | 8/1995 |
| JP | 2001297507 | 9/1999 |
| JP | 200172749 | 3/2001 |
| WO | 2004/016449 | 2/2004 |
| WO | 2006013448 | 9/2006 |

OTHER PUBLICATIONS

PCT Written Opinion, PCT/IB2005/002255, Mar. 2, 2006, 7 pgs.

Office Action from U.S. Appl. No. 12/332,373; Apr. 29, 2011; 23 pages.

* cited by examiner

CALENDAR BINDING APPARATUS AND RELATED METHODS

CROSS-REFERENCE TO RELATED APPLICATIONS

This application is a continuation-in-part of U.S. patent application Ser. No. 11/187,556 filed on Jul. 22, 2005, now U.S. Pat. No. 7,780,370 which claimed the benefit of U.S. Provisional Application Ser. No. 60/592,921, filed Jul. 30, 2004. This application is being filed concurrently with U.S. patent application Ser. No. 12/332,373, titled ENVIRONMENTALLY FRIENDLY BINDING OF CALENDARDS, and which is also a continuation-in-part of U.S. patent application Ser. No. 11/187,556 now U.S. Pat. No. 7,780,370. Each of these above-referenced applications is hereby incorporated by reference in its entirety.

FIELD OF THE INVENTION

The present invention is generally related to apparatus and methods for making calendars and, more particularly, to apparatus and methods for making single-sheet calendars.

BACKGROUND OF THE INVENTION

Single-sheet calendars are known and typically include a printed sheet of paper or laminate material and a pair of binders at opposed edges of the sheet. The calendar may include a hanger that permits hanging of the calendar from a support such as hook, nail, or equivalent. It would be desirable to provide apparatus and related methods that facilitate making of such single-sheet calendars. Further, known binding methods rely on locking pages of a calendar into a metal binder with a double fold, which in turn requires relatively complex and expensive apparatus using cams and other structures. In known binding methods for binding the top and bottom edges of single sheet calendars, for example, each of the edges is bound in a separate operation, with each operation requiring folding of the binder and/or paper.

SUMMARY OF THE INVENTION

In one embodiment, an apparatus is provided for binding a single printed sheet with a top and in some instances a bottom binder to form a single sheet calendar. The apparatus includes a binder feeding mechanism for positioning the top and bottom binders relative to the single printed sheet. The apparatus includes first and second spaced, parallel binding units for respectively securing the top and bottom binders to the single sheet, with the first binding unit having an upper member and a lower member to define a sheet-receiving channel there between. At least one of the upper or the lower member is heated, and at least one of the upper or the lower member is controllably movable relative to the other of the upper or the lower member, to secure one of the binders to the single sheet. A sheet feeding mechanism of the apparatus feeds the single sheet toward the sheet-receiving channel of the first binding unit.

At least one of the binders may include a biodegradable bar having an adhesive thereon, with the lower member being heated sufficiently to melt the adhesive to the single sheet. The lower member may be substantially fixed and the upper member may be movable toward the lower member and cooperates with the lower member to apply sufficient pressure onto the single sheet and biodegradable bar to secure the single sheet and biodegradable bar relative to one another. At least one of the binding units may be movable relative to the other of the binding units to selectively adjust the space there between for accommodating single sheets of different lengths.

The binding units may be fixed relative to one another therein securing of the binders to the single sheet. The apparatus may include a control device that is operatively coupled to the first and second binding units, with the control device being configured to simultaneously secure the top and bottom binders to the single sheet. The channel of the first binding unit may extend in a longitudinal direction, with the sheet feeding mechanism being configured to move the single sheet in the longitudinal direction. The sheet feeding mechanism may be configured to move the single sheet along the sheet-receiving channel in the longitudinal direction.

The sheet feeding mechanism may be configured to move the single sheet calendar downstream of the binding units in the longitudinal direction. In one specific embodiment, the sheet feeding mechanism is configured to feed a new single sheet into that sheet-receiving channel while simultaneously moving that single sheet calendar downstream of the binding units. The first binding unit may be sized to accommodate a binder having a hanger extending transversely therefrom.

The apparatus may include a magazine for holding a plurality of stacked binders, with the binder feeding mechanism being operatively coupled to the magazine to feed binders from the magazine toward the binding units in a direction transverse to a direction of flow of the single sheet toward the channel. The apparatus may include a sheet supply for holding a plurality of single sheets, with the sheet feeding mechanism being operatively coupled to the sheet supply to feed single sheets from the sheet supply to the binding units.

The apparatus may include a roller for holding a roll of binders attached to a carrier web at spaced intervals. With the binder feeding mechanism being operatively coupled to the roller to remove binders from the carrier web, cut or part the binders from the roll and feed them from the roll toward the binding units. At least one of the binding units may include an applicator for applying adhesive onto a corresponding binder to secure the corresponding binder to the single sheet.

In another embodiment, an apparatus is provided for binding a single printed sheet with a top and in some instances a bottom binder to form a single sheet calendar. The apparatus includes a binder feeding mechanism for positioning the top and bottom binders relative to the single printed sheet. First and second spaced, parallel binding units are provided for respectively securing the top and bottom binders to the single sheet, with each of the binding units having a heated lower member and an upper member defining a sheet-receiving channel there between.

The lower member is heated and the upper member is controllably movable toward the lower member to respectively secure the top and bottom binders to the single sheet. At least one of the binding units is movable relative to the other of the binding units for accommodating single sheets of different lengths, with the binding units having fixed positions relative to one another during securing of the binders to the single sheet. A sheet feeding mechanism is provided for feeding the single sheet toward the sheet-receiving channels of the binding units.

In yet another embodiment, a method is provided for making a single sheet calendar. The method includes feeding a single printed sheet along opposed channels of a pair of spaced, parallel binding units. The method also includes feeding a pair of binders relative to the single sheet and controllably directing heat from the binding units to the binders. The channels are closed to secure the binders to the single sheet.

The method may include simultaneously feeding a single sheet into the channels and moving the single sheet calendar downstream of the binding units.

The method may alternatively or additionally include feeding the single sheet into the channels in a direction generally parallel to a longitudinal direction of the channels. The method may include applying a coat of adhesive onto a biodegradable bar of at least one of the binders prior to feeding the at least one of the binders along a respective channel. The method may include simultaneously closing both of the channels to secure both binders to the single sheet. The spacing between the binding units may be adjusted to accommodate a length of the single sheet.

Notably, one or more of the embodiments described herein permit binding of a calendar with a single up and down motion in a single plane and rely on chemical or quasi-chemical rather than purely mechanical binding methods, which results in simpler, less expensive binding apparatus and processes. Likewise, one or more of the embodiments described herein permit simultaneous binding of the top and bottom edges of a single sheet calendar in a one-step operation, without requiring any folding of the binder or paper.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

DETAILED DESCRIPTION

Figure 1:
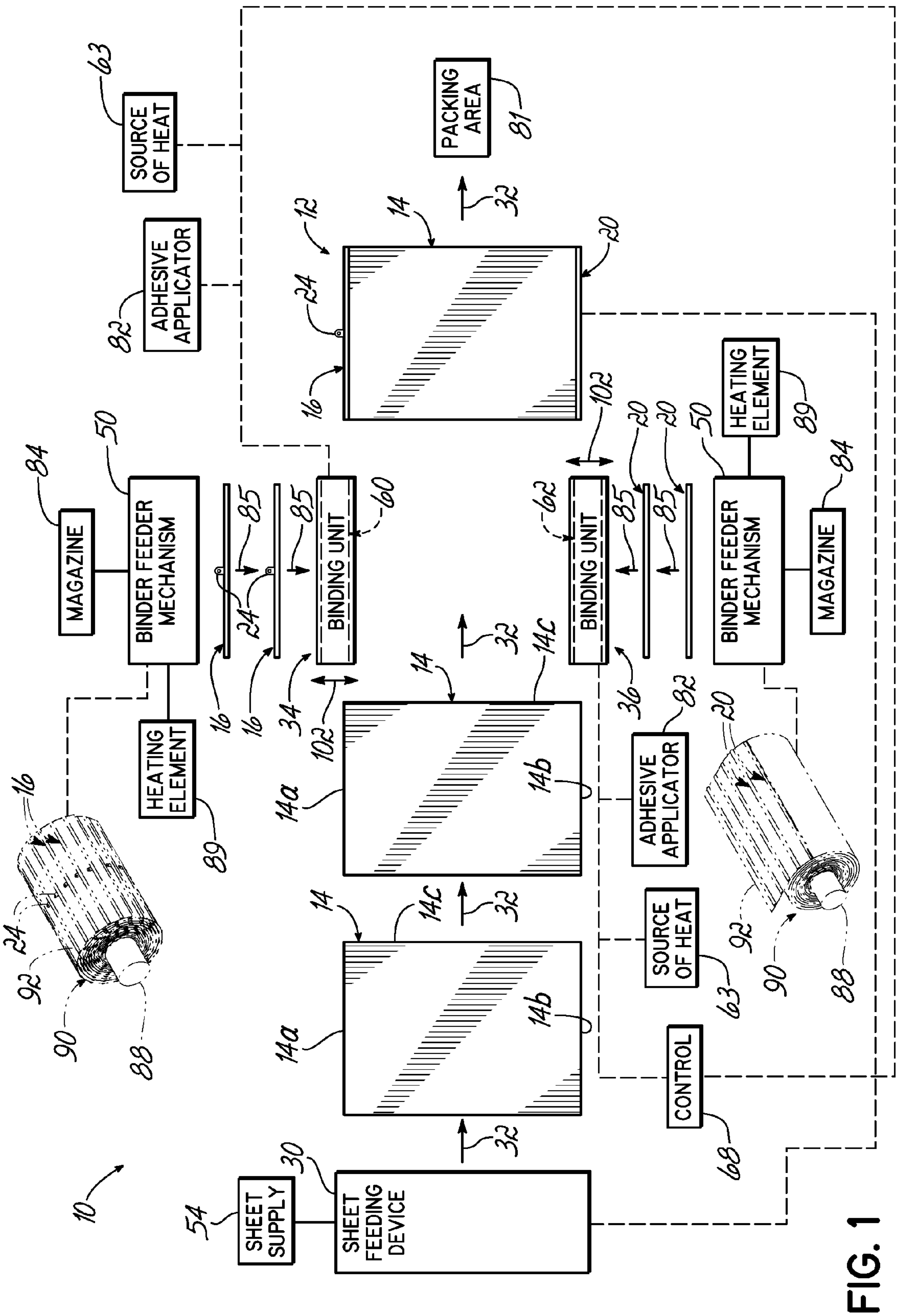
FIG. 1 is a schematic view of an apparatus in accordance with an embodiment of the invention.

With reference to the figures and, more particularly to FIG. 1, an apparatus 10 is provided for making a single-sheet calendar 12 which may, for example and without limitation, be an environmentally friendly calendar generally as described in U.S. patent application Ser. No. 11/187,556, published as US 2006/0059733 and also PCT Application No. WO 2006/013448, each of which is assigned to the assignee of the present invention and the disclosure of each is hereby incorporated by reference herein in its entirety. An exemplary single sheet calendar 12 in accordance with the principles of the present disclosure includes a single sheet 14 of printed material such as fabric, paper, paperboard, film, or a laminate having a combination of any of the above. The single sheet calendar 12 includes a top binder 16 secured along a top edge 14*a* of the sheet 14, and in some instances an optional bottom binder 20 secured along a bottom edge 14*b* of the sheet 14. A hanger 24 extends from the top main portion of the top binder 16 and is used to hang the calendar 12 from a hook, nail or equivalent structure protruding from a wall or the like. It is contemplated that a single sheet calendar may have any number of binders other than two, for example and without limitations, one.

The exemplary apparatus 10 includes several schematically-depicted components. A sheet feeding device or mechanism 30 feeds each of the single sheets 14 along a general direction of flow (arrows 32) toward a pair of spaced and generally parallel binding units 34, 36 that respectively engage the top and bottom edges 14*a*, 14*b* of the sheet 14. Naturally, if only the top edge 14*a* of the single sheet is to receive a top binder 16, then the lower binding unit 36 is inactive and/or not present. A binder feeding mechanism or device 50 feeds each of the top and bottom binders 16, 20 toward the binding units 34, 36 such that the binding units 34, 36 may respectively secure the binders 16, 20 to the edges 14*a*, 14*b*, as explained in further detail below. The binder feeding mechanism may be a single mechanism or alternatively be in the form of two or more separate mechanisms. For purposes of illustration and ease of understanding, the present description refers to a "binder feeding mechanism" and assigns it the numeral 50, though this is merely illustrative and therefore not intended to be limiting.

The sheet feeding mechanism 30 engages each of the sheets 14, retrieving them, in one embodiment, from a supply 54 of sheets 14 that may, for example, accommodate stacks of such sheets 14. The sheet feeding mechanism 30 feeds each of the sheets 14 in the direction of flow (arrows 32), into and along longitudinal channels 60, 62 of the binding units 34, 36, that extend generally parallel to the direction of flow.

Figure 2A:
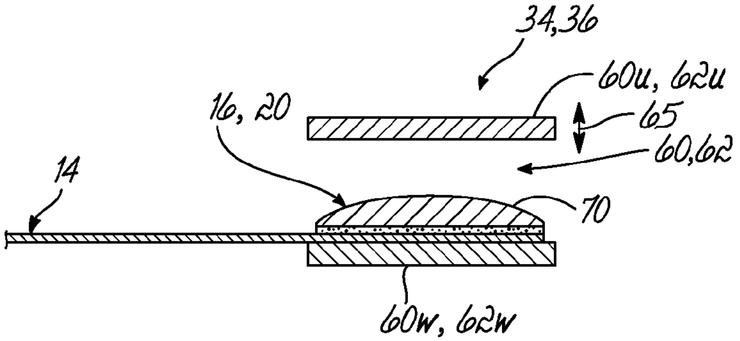
FIG. 2A is an end view of a binding unit of the apparatus of FIG. 1.
Figure 2B:
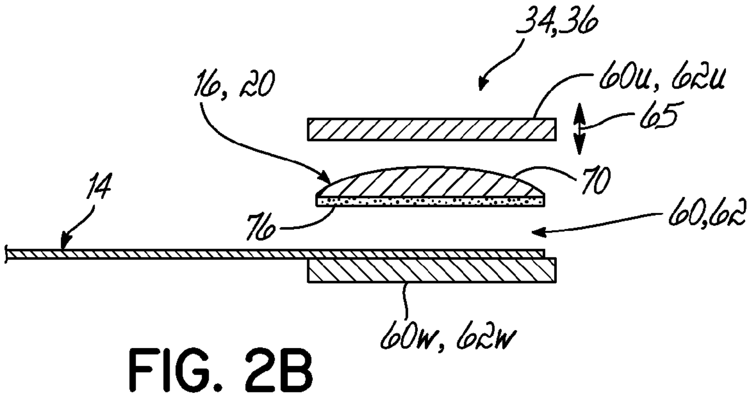
FIG. 2B is a view similar to FIG. 2A illustrating a bar of a binder spaced from a sheet of a single sheet calendar.
Figure 3:
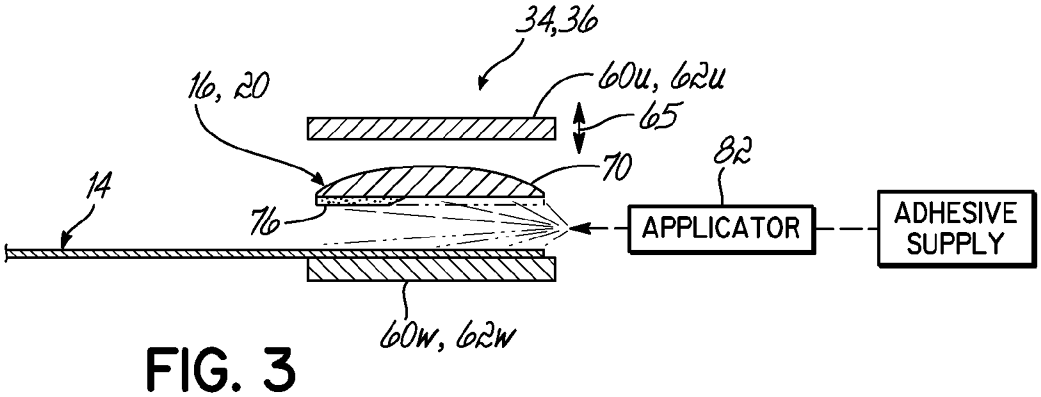
FIG. 3 is a view similar to FIGS. 2A-2B, illustrating a binding unit including an adhesive applicator.

With continued reference to FIG. 1, and with further reference to FIGS. 2A, 2B, and 3, each of the channels 60, 62 is defined by corresponding pairs of opposed upper and lower members that secure the binders 16, 20 to each of the sheets 14. More specifically, the first channel 60 is defined by an upper member 60*u* and a lower member 60*w* and is configured to engage the top edge 14*a*, while a second channel 62 is defined by an upper member 62*u* and a lower member 62*w* configured to engage the bottom edge 14*b* of the sheet 14.

Each of the lower members 60*w*, 62*w* is heated, for example by an electrical source of heat 63 coupled to the binding units 34, 36. In this exemplary embodiment, each of the lower members 60*w*, 62*w* is relatively fixed in position while each of the corresponding upper members 60*u*, 62*w* is movable towards a corresponding one of the lower members 60*w*, 62*w* (arrows 65). The movement of each of the upper members 60*u*, 62*u* effectively closes the channels 60, 62 with sufficient pressure to secure the binders 16, 20 to the sheet 14. Further, in this exemplary embodiment, the binding units 34, 36 are operatively coupled to a control 68 that simultaneously moves the upper members 60*u*, 62*u* to thereby secure the top and bottom binders 16, 20 simultaneously to the sheet 14.

Notably, one or both of the binding units 34, 36 is configured to receive and secure, within the respective channels 60, 62, top binders 16 each having a hanger 24 extending transversely to a length dimension of the top binders 16 or other transversely extending features. For example, and without limitation, the processing of binders 16 with transversely extending features may be facilitated by a relatively large width (i.e., the transverse direction) of the upper and lower members 60*u*, 60*w*, 62*u*, 62*w*. Additionally or alternatively, such processing may be facilitated by complete separation of each upper member 60*u*, 62*u* from a corresponding lower member 60*w*, 62*w*, rather than, for example, pivotal movement of an upper member 60*u*, 62*u* from a corresponding lower member 60*w*, 62*w*.

While the exemplary binding units described above include upper and lower members as described, those of ordinary skill in the art will readily appreciate that variations may be introduced and still fall within the scope of the present disclosure. For example, and without limitation, one or both of the binding units 34, 36 may have both of the upper and lower members heated or may simply have the upper member heated rather than the lower member. Other contemplated variations include a binding unit where the lower member moves toward the upper member or where both of the upper and lower members move toward one another.

In one specific embodiment, and with particular reference to FIGS. 2A-2B, the apparatus 10 is configured to secure binders 16, 20 to the sheet 14, wherein one or both of the binders 16, 20 include a securing structure that may be substantially hollow, substantially solid, or any combination of both of these types of structures. The securing structure may be in the form of a biodegradable rigid bar 70 made, for example, of wood, cardboard, fibrous plant material or a suitable biodegradable synthetic plastic material. The bar 70 may be attached to the sheet 14 by a coat of heat-activated adhesive 76. More specifically, the adhesive coat 76 may, for example, be applied to each of the bars 70 prior to the sheet 14 (with the binders 16, 20 pre-attached) being fed through the channels 60, 62. In this regard, the heat of the lower members 60*w*, 62*w* applies heat through the sheet 14 to the adhesive 76, which in turn responds by melting and further adhesively securing the biodegradable bar 70 to the sheet 14. In another specific embodiment, one or both of the binding units 34, 36 may have an applicator 82 that dispenses adhesive and applies it onto the biodegradable bar 70 and/or the sheet 14 in or adjacent the channels 60, 62.

As discussed above, the sheet feeding mechanism 30 feeds each of the sheets 14 in the general direction of flow (arrows 32). Moreover, the sheet feeding mechanism 30 is configured to simultaneously feed a single sheet 14 through the channels 60, 62 of the binding units 34, 36 and remove a finished single sheet calendar 12 from the binding units 34, 36. In this exemplary embodiment, the sheet feeding mechanism 30 removes the finished single sheet calendar 12 also in the direction of flow (arrows 32) and toward a packing region 81. The sheet feeding mechanism 30 selectively stops movement of each sheet 14 relative to the binding units 34, 36 when the leading edge 14*c* of the sheet 14 reaches a desired location relative to the channels 60, 62. The top and bottom binders 16, 20 are also moved relative to each of the sheets 14 and, more particularly in this embodiment, toward the binding units 34, 36.

In this exemplary embodiment, each of the top and bottom binders 16, 20 is fed by the binder feeding mechanism 50 in a direction (arrows 85) generally transverse to the direction of flow (arrows 32) toward each of the binding units 34, 36. The binder feeding mechanism 50 feeds each of the binders 16, 20 substantially in consistent orientation relative to the sheet 14. Further, the binder feeding mechanism 50 is configured to feed binders 16, 20 that are either loosely and randomly held in a binder station and/or may be configured to feed binders 16, 20 that are supplied in stack form.

Figure 4:
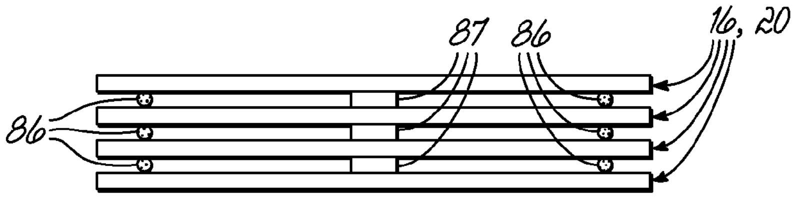
FIG. 4 is a schematically-depicted elevational view of a stack of binders.

In this exemplary embodiment, for example, the binder feeding mechanism 50 is operatively coupled to magazines 84 holding respective stacks of each of the binders 16, 20 and is thus configured to remove individual binders 16, 20 from the stacks and feed them to other portions of the apparatus 10. The stacks of binders 16, 20 in the magazines 84 may, for example, include suitably positioned spots or lines 86 of adhesive between adjacent binders 16, 20 to thereby keep the binders in stack form. With particular reference to FIG. 4, one or more separators 87 may be disposed between adjacent binders to permit their separation from one another. In this regard, for example, the binder feeding mechanism 50 may include a heating element 89 that heats the spots or lines of adhesive to thereby permit separation of the adjacent binders 16, 20 in a stack.

Notably, the same spots or lines 86 of adhesive 76 that secure adjacent binders 16, 20 in stack form may be used to temporarily secure each of the binders 16, 20 to the sheet 14 prior to feeding the sheet 14 (with pre-attached binders 16, 20) toward the binding units 34, 36, as explained above. It is contemplated that the adhesive 76 holding adjacent binders 16, 20 together in stack form may be either the same or different from the adhesive used to temporarily attached the binders 16, 20 the sheet 14. Or as discussed above, alternatively, the binding process securing the binders 16, 20 to the sheet 14 may include no adhesive at all.

It is contemplated that, alternatively, the binder feeding mechanism 50 may instead or additionally be operatively coupled to one or more rollers 88 that support and permit unwinding of respective rolls 90 feeding each of the binders 16, 20. More specifically, each of the rolls 90 is made up of a carrier web 92 that supports individual binders 16, 20 that are spaced at intervals. A non-limiting example of such roll is described in the above-referenced U.S. patent application Ser. No. 11/187,556. Accordingly, the binder feeding mechanism 50 of such alternative embodiment may be configured to remove the binders 16, 20 from the carrier web 92 and/or remove portions of the carrier web along with a binder 16, 20 and feed the same to a corresponding binding unit 34, 36.

The binder feeding mechanism 50 feeds the top and bottom binders 16, 20 until they are in respective registration with desired locations along the edges 14*a*, 14*b* of the sheet 14. For example, and without limitation, a calendar may have a sheet 14 and binders 16, 20 having substantially the same width, in which case the binder feeding mechanism 50 as well as the sheet feeding mechanism 30 will respectively feed the binders 16, 20 and sheet 14 into the binding units 34, 36 so that their respective leading edges are in registration with one another. It is contemplated, alternatively, that the binder feeding mechanism 50 may feed the binders 16, 20 to the sheet 14 and allow the sheet feeding mechanism 30 to feed the sheet 14 and binders 16, 20, for example pre-attached through the adhesive coat 76, into the binding units 34, 36.

The apparatus 10 is capable of making calendars 12 of different width. In this regard, the apparatus 10 is thus capable of handling single sheets 14 of such different lengths. More specifically, the binding units 34, 36 are mounted or supported such that the spacing between them can be adjusted in the general direction of arrow 102. To this end, one or both of the binding units 34, 36 may be movable toward the other of the binding units 34, 36 to permit such adjustment. This adjustment may be manual and/or automatic, for example, upon detection or reception of a signal corresponding to the width of a specific sheet 14. Once the adjustment is completed, the binding units 34, 36 remain fixed in position during the binding process i.e., during the securing of the binders 16, 20 to the sheet 14.

From the above disclosure of the general principles of the present invention and the preceding detailed description of at least one preferred embodiment, those skilled in the art will readily comprehend the various modifications to which this invention is susceptible. Therefore, I desire to be limited only by the scope of the following claims and equivalents thereof.

What is claimed is:

1. An apparatus for binding a single printed sheet with a top and bottom binder to form a single sheet calendar, comprising:

a binder feeding mechanism for positioning the top and bottom binders relative to the single printed sheet;

a first binding unit for securing the top binder to the single sheet, said first binding unit operatively connected to said binder feeding mechanism for receiving the top binder, said first binding unit having a first upper member and a first lower member defining a first sheet-receiving channel there between, at least one of said first upper member or said first lower member being heated, at least one of said first upper member or said first lower member being controllably movable relative to the other of said first upper member or said first lower member to secure the top binder to the single sheet;

a second binding unit for securing the bottom binder to the single sheet, said second binding unit operatively connected to said binder feeding mechanism for receiving the bottom binder, said second binding unit having a second upper member and a second lower member defining a second sheet-receiving channel there between, at least one of said second upper member or said second lower member being heated, at least one of said second upper member or said second lower member being controllably movable relative to the other of said second upper member or said second lower member to secure the bottom binder to the single sheet; and a sheet feeding mechanism adjacent to said first and second binding units for feeding the single sheet toward said first and second sheet-receiving channels of said first and second binding units, respectively, wherein said first and second sheet-receiving channels are parallel and spaced apart from each other for receiving respective first and second ends of the single sheet.

2. The apparatus of claim 1, wherein the top and bottom binder each include a biodegradable bar having an adhesive thereon, the first and second lower members being heated sufficiently to melt the adhesive through the single sheet.

3. The apparatus of claim 2, wherein said first and second lower members are substantially fixed and said first and second upper members are movable toward said first and second lower members, respectively, and cooperate with said first and second lower members to apply sufficient pressure onto the top and bottom ends of the single sheet and biodegradable bar to secure the single sheet and biodegradable bar relative to one another.

4. The apparatus of claim 1, wherein at least one of said first and second binding units is movable relative to the other of said first and second binding units to selectively adjust the space between said first and second sheet-receiving channels for accommodating single sheets of different lengths.

5. The apparatus of claim 4, wherein said first and second binding units are fixed relative to one another during securing of the binders to the single sheet.

6. The apparatus of claim 1, further comprising:

a control device operatively coupled to said first and second binding units, said control device configured to simultaneously secure the top and bottom binders to the single sheet.

7. The apparatus of claim 1, wherein said first and second channels of said first and second binding units each respectively extend in a longitudinal direction, said sheet feeding mechanism being configured to move the single sheet in the longitudinal direction.

8. The apparatus of claim 7, wherein said sheet feeding mechanism is configured to move the single sheet along said first and second sheet-receiving channels in the longitudinal direction.

9. The apparatus of claim 7, wherein said sheet feeding mechanism is configured to move the single sheet calendar downstream of said first and second binding units in the longitudinal direction.

10. The apparatus of claim 9, wherein said sheet feeding mechanism is configured to feed a new single sheet into said first and second sheet-receiving channels while simultaneously moving the single sheet calendar downstream of said first and second binding units.

11. The apparatus of claim 1, wherein said first binding unit is sized to accommodate a top binder having a feature extending transversely there from.

12. The apparatus of claim 1, further comprising:

a magazine for holding a plurality of stacked binders, said binder feeding mechanism operatively coupled to said magazine to feed binders from said magazine toward said first and second binding units in a direction transverse to a direction of flow of the single sheet toward said first and second channels.

13. The apparatus of claim 1, further comprising:

a roller for holding a roll of binders attached to a carrier web at spaced intervals, said binder feeding mechanism operatively coupled to said roller to remove binders from the carrier web and feed them from the roll toward said first and second binding units.

14. The apparatus of claim 1, wherein said first and second binding unit each include an applicator for applying adhesive onto a corresponding binder to secure the corresponding binder to the single sheet.

15. The apparatus of claim 1, further comprising:

a sheet supply for holding a plurality of single sheets, said sheet feeding mechanism operatively coupled to said sheet supply to feed single sheets from said sheet supply to said first and second binding units.

16. The apparatus of claim 1 wherein the first binding unit is spaced from the second binding unit.

17. The apparatus of claim 16 wherein the second binding unit is downstream from the first binding unit.

* * * * *